United States Patent
Mok et al.

(10) Patent No.: US 12,509,162 B2
(45) Date of Patent: Dec. 30, 2025

(54) MICRO VEHICLE

(71) Applicants: Hyundai Motor Company, Seoul (KR); Kia Corporation, Seoul (KR)

(72) Inventors: In Kyoung Mok, Hwaseong-si (KR); Huen Sick Min, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 18/887,205

(22) Filed: Sep. 17, 2024

(65) Prior Publication Data
US 2025/0333115 A1 Oct. 30, 2025

(30) Foreign Application Priority Data
Apr. 30, 2024 (KR) ........................ 10-2024-0057932

(51) Int. Cl.
*B62D 25/08* (2006.01)
(52) U.S. Cl.
CPC .................................. *B62D 25/088* (2013.01)
(58) Field of Classification Search
CPC .... B62D 21/11; B62D 25/145; B62D 25/081; B62D 31/003; B62D 25/088; B60S 1/0438; B60S 1/0463
USPC .................................................. 280/124.155
See application file for complete search history.

(56) References Cited

U.S. PATENT DOCUMENTS

| | | | | |
|---|---|---|---|---|
| 5,174,627 A | 12/1992 | Cleereman et al. | | |
| 7,040,639 B2 * | 5/2006 | Tamura | ................ | B62D 25/088 |
| | | | | 280/124.147 |
| 7,703,805 B2 * | 4/2010 | Sasaki | ................. | B62D 21/152 |
| | | | | 296/203.02 |
| 7,828,330 B2 * | 11/2010 | Tamura | ................ | B62D 25/088 |
| | | | | 296/203.02 |
| 7,845,716 B2 * | 12/2010 | Kiyotake | ............. | B62D 25/082 |
| | | | | 296/203.02 |
| 8,746,784 B2 * | 6/2014 | Hanakawa | ........... | B62D 25/088 |
| | | | | 296/193.09 |
| 8,801,088 B2 * | 8/2014 | Lee | ...................... | B62D 25/088 |
| | | | | 296/203.02 |
| 11,110,964 B2 * | 9/2021 | Heo | ..................... | B62D 25/081 |
| 11,124,237 B2 * | 9/2021 | Heo | ..................... | B62D 21/152 |
| 2008/0100073 A1 * | 5/2008 | Mitsuyama | .......... | B62D 25/163 |
| | | | | 293/132 |
| 2010/0117325 A1 | 5/2010 | Lee et al. | | |
| 2014/0097590 A1 * | 4/2014 | Yoo | ..................... | B62D 25/088 |
| | | | | 280/124.155 |
| 2017/0334278 A1 * | 11/2017 | Yamamoto | .......... | B62D 31/003 |

(Continued)

FOREIGN PATENT DOCUMENTS

| CN | 212637074 U | * | 3/2021 |
| JP | H05185953 A | | 7/1993 |
| JP | 2001063630 A | * | 3/2001 |

(Continued)

*Primary Examiner* — Paul N Dickson
*Assistant Examiner* — Caitlin Anne Miller
(74) *Attorney, Agent, or Firm* — Slater Matsil, LLP

(57) ABSTRACT

An embodiment micro vehicle includes a vehicle body and a chassis frame structure supporting the vehicle body. The vehicle body includes a front structure including a front damper mounting panel having a pair of front damper mounting bosses, a rear structure including a rear damper mounting panel having a pair of rear damper mounting bosses, and a pair of side panels.

20 Claims, 10 Drawing Sheets

(56) References Cited

U.S. PATENT DOCUMENTS

2020/0324826 A1* 10/2020 Heo ................. B62D 21/11

FOREIGN PATENT DOCUMENTS

| | | |
|---|---|---|
| JP | 2015003724 A | 1/2015 |
| KR | 101352598 B1 | 2/2014 |
| KR | 20140013617 A | 2/2014 |
| KR | 102480541 B1 | 12/2022 |

* cited by examiner

MICRO VEHICLE

CROSS-REFERENCE TO RELATED APPLICATIONS

This application claims the benefit of Korean Patent Application No. 10-2024-0057932, filed on Apr. 30, 2024, which application is hereby incorporated herein by reference in its entirety.

TECHNICAL FIELD

The present disclosure relates to a micro vehicle.

BACKGROUND

Recently, various types of vehicles have been released due to the spread of vehicles and technological changes that meet the diverse needs of consumers. In addition, as interest in vehicle fuel consumption increases, the technological development of eco-friendly vehicles such as hybrid vehicles and electric vehicles is also accelerating. Accordingly, various types of micro vehicles are being released and research and development thereof are being conducted.

Micro vehicle is a term often used for the smallest size of vehicles that are lighter in weight and smaller in size than small, lightweight vehicles and can accommodate two or fewer people and drive short or medium distances. Each country has different standards for micro vehicles. There are various types of micro vehicles such as two-seater micro vehicles, micro vehicles with an engine displacement of approximately 50 to 500 cc, and micro electric vehicles equipped with electric motors. For example, a micro electric vehicle is smaller than existing passenger cars (four seats or more) and larger than two-wheeled vehicles (one seat), and is a means of transportation optimized for short-distance travel in the range of 10 to 30 km. The micro electric vehicles are more economical than passenger cars and have the following advantages over two-wheeled vehicles: safety, overcoming limitations, and being easy to change for various purposes.

In addition, the micro vehicles drive at relatively low speeds and are small in size, so they may relieve urban traffic congestion and minimize air pollution.

In general, the micro vehicle may be provided with two seats in its passenger compartment. The micro vehicle may include a vehicle body and a chassis frame that supports the vehicle body, a driving module, and the like. The vehicle body of the micro vehicle may be made of synthetic resin, so it is lightweight. The micro vehicle may have a smaller number of parts/components, and the manufacturing cost thereof may be reduced.

The existing vehicle may include a pair of front damper housings in which a pair of front dampers are mounted and a pair of rear damper housings in which a pair of rear dampers are mounted.

However, the pair of front damper housings may be disconnected in a width direction of the vehicle, resulting in poor connectivity between the pair of front dampers, and the pair of rear damper housings may be disconnected in the width direction of the vehicle, resulting in poor connectivity between the pair of rear dampers.

The above information described in this background section is provided to assist in understanding the background of the inventive concept and may include any technical concept which is not considered as the already known prior art.

SUMMARY

The present disclosure relates to a micro vehicle. Particular embodiments relate to a micro vehicle having a chassis frame structure designed to support a vehicle body in various directions, thereby improving connectivity between the vehicle body and the chassis frame structure.

Embodiments of the present disclosure can solve problems occurring in the prior art while advantages achieved by the prior art are maintained intact.

An embodiment of the present disclosure provides a micro vehicle designed to increase connectivity between a pair of front dampers and connectivity between a pair of rear dampers, thereby improving mounting stiffness of the front dampers and the rear dampers and static stiffness of the vehicle.

According to an embodiment of the present disclosure, a micro vehicle may include a vehicle body, including a front structure, a rear structure, and a pair of side panels, and a chassis frame structure supporting the vehicle body. The front structure may include a front damper mounting panel having a pair of front damper mounting bosses, and the rear structure may include a rear damper mounting panel having a pair of rear damper mounting bosses.

Each front damper mounting boss may include a sidewall protruding upward from a top surface of the front damper mounting panel, a top wall provided on a top edge of the sidewall, and a mounting hole provided in the top wall.

Each front damper mounting boss may further include a plurality of reinforcing ribs connected to the sidewall.

The front damper mounting panel may further include a pair of front reinforcing members embedded in the pair of front damper mounting bosses, respectively.

Each front reinforcing member may include a first reinforcing portion embedded in a portion of the front damper mounting panel adjacent to the front damper mounting boss and a second reinforcing portion embedded in the front damper mounting boss.

The second reinforcing portion may include a sidewall embedded in the sidewall of the front damper mounting boss, a top wall embedded in the top wall of the front damper mounting boss, and a mounting hole provided in the top wall. The mounting hole of the second reinforcing portion may be aligned with the mounting hole of the front damper mounting boss.

Each rear damper mounting boss may include a sidewall protruding upward from a top surface of the rear damper mounting panel, a top wall provided on a top edge of the sidewall, and a mounting hole provided in the top wall.

Each rear damper mounting boss may further include a plurality of reinforcing ribs connected to the sidewall.

The rear damper mounting panel may further include a pair of rear reinforcing members embedded in the pair of rear damper mounting bosses, respectively.

Each rear reinforcing member may include a first reinforcing portion embedded in a portion of the rear damper mounting panel adjacent to the rear damper mounting boss and a second reinforcing portion embedded in the rear damper mounting boss.

The second reinforcing portion includes a sidewall embedded in the sidewall of the rear damper mounting boss, a top wall embedded in the top wall of the rear damper mounting boss, and a mounting hole provided in the top wall. The mounting hole of the second reinforcing portion may be aligned with the mounting hole of the rear damper mounting boss.

The front structure may further include a plurality of front mounting bosses provided on both side edges thereof. A front portion of each side panel may be mounted in the plurality of front mounting bosses through a plurality of fasteners.

The rear structure may further include a plurality of rear mounting bosses provided on both side edges thereof. A rear portion of each side panel may be mounted in the plurality of rear mounting bosses through a plurality of fasteners.

BRIEF DESCRIPTION OF THE DRAWINGS

The above and other objects, features, and advantages of embodiments of the present disclosure will be more apparent from the following detailed description taken in conjunction with the accompanying drawings, in which.

DETAILED DESCRIPTION OF ILLUSTRATIVE EMBODIMENTS

Figure 1:
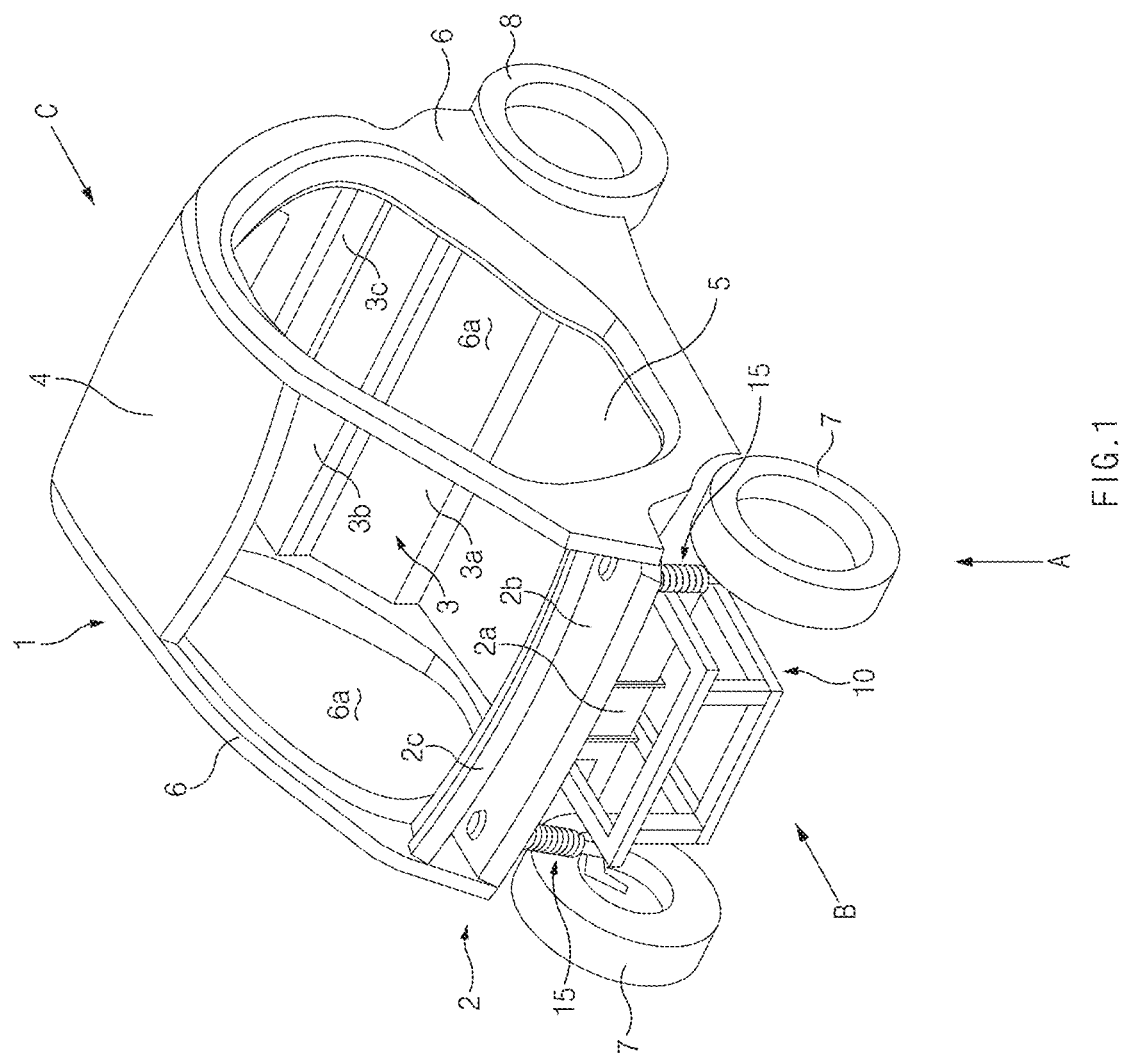
FIG. 1 illustrates a perspective view of a micro vehicle according to an exemplary embodiment of the present disclosure.

Hereinafter, exemplary embodiments of the present disclosure will be described in detail with reference to the accompanying drawings. In the drawings, the same reference numerals will be used throughout to designate the same or equivalent elements. In addition, a detailed description of well-known techniques associated with the present disclosure will be omitted in order not to unnecessarily obscure the gist of the present disclosure.

Terms such as first, second, A, B, (a), and (b) may be used to describe the elements in exemplary embodiments of the present disclosure. These terms are only used to distinguish one element from another element, and the intrinsic features, sequence, order, and the like of the corresponding elements are not limited by the terms. Unless otherwise defined, all terms used herein, including technical or scientific terms, have the same meanings as those generally understood by those with ordinary knowledge in the field of art to which the present disclosure belongs. Such terms as those defined in a generally used dictionary are to be interpreted as having meanings equal to the contextual meanings in the relevant field of art and are not to be interpreted as having ideal or excessively formal meanings unless clearly defined as having such in the present application.

Referring to FIG. 1, a micro vehicle according to an exemplary embodiment of the present disclosure may include a vehicle body 1 made of various synthetic resin materials and a chassis frame structure 10 supporting the vehicle body 1. The vehicle body 1 may be designed to have a passenger compartment in which a minimum number of seats (for example, two seats) are placed. The vehicle body 1 may include a front structure 2 facing the front of the vehicle, a rear structure 3 facing the rear of the vehicle, a roof 4 covering the top of the vehicle, a floor 5 provided on the bottom of the vehicle, and a pair of side panels 6 disposed on both sides of the vehicle. The front structure 2, the rear structure 3, the roof 4, the floor 5, and the side panels 6 may be made of synthetic resin materials.

Figure 3:
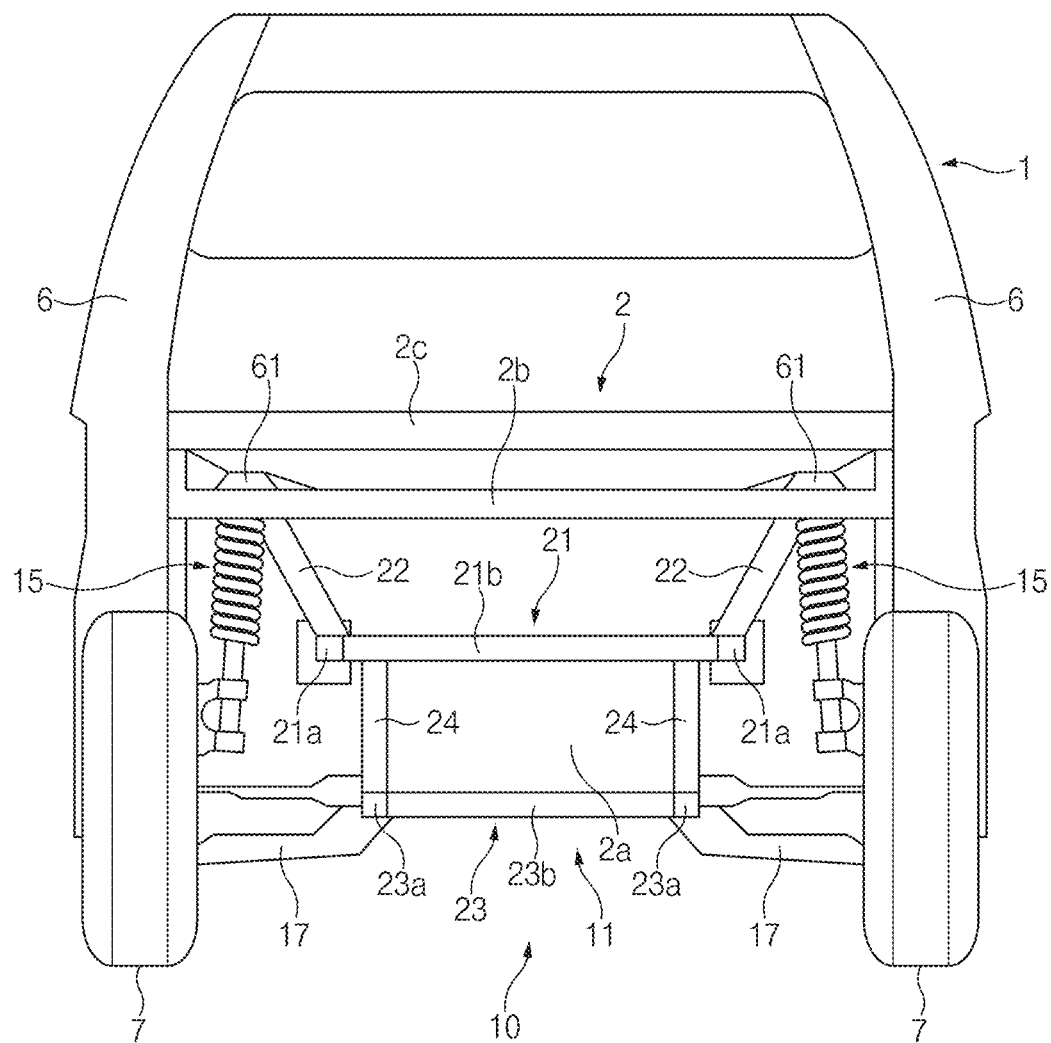
FIG. 3 illustrates a view, which is viewed in a direction indicated by arrow B of FIG. 1.

Referring to FIG. 1, the front structure 2 may at least partially cover the front of the passenger compartment of the vehicle body 1. According to an exemplary embodiment, the front structure 2 may include a dash panel 2a covering the front of the passenger compartment of the vehicle body 1, a front damper mounting panel 2b mounted on an upper portion of the dash panel 2a, and a cowl member 2c mounted on a top edge of the dash panel 2a. Referring to FIG. 3, a front damper 15 such as a shock absorber may be connected to each front wheel 7, and the pair of front dampers 15 may be mounted on the front damper mounting panel 2b.

Figure 4:
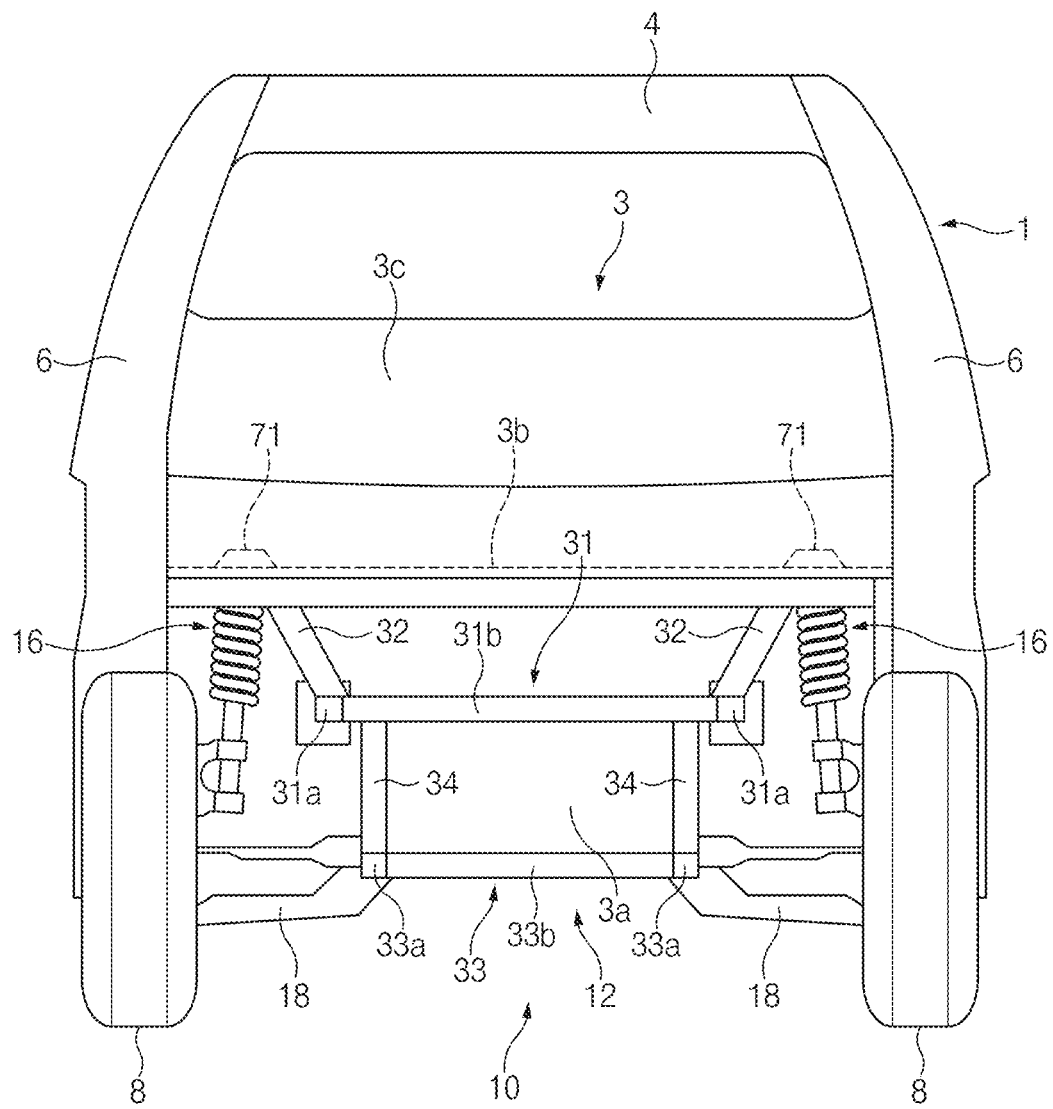
FIG. 4 illustrates a view, which is viewed in a direction indicated by arrow C of FIG. 1.

Referring to FIG. 1, the rear structure 3 may at least partially cover the rear of the passenger compartment of the vehicle body 1. According to an exemplary embodiment, the rear structure 3 may include a lower cover member 3a connected to the floor 5, a rear damper mounting panel 3b connected to a top edge of the lower cover member 3a, and a back panel 3c mounted on the rear damper mounting panel 3b. Referring to FIG. 4, a rear damper 16 such as a shock absorber may be connected to each rear wheel 8, and the pair of rear dampers 16 may be mounted on the rear damper mounting panel 3b.

The roof 4 may be mounted to connect top portions of the pair of side panels 6.

The floor 5 may be configured to connect a bottom end of the front structure 2 and a bottom end of the rear structure 3.

The pair of side panels 6 may be provided on both sides of the passenger compartment of the vehicle body 1, and each side panel 6 may have one door opening 6a in which a door is mounted.

A front opening may be defined between a front edge of the roof 4, a top edge of the front structure 2, and front portions of the pair of side panels 6, and a front window glass may be mounted in the front opening.

A rear opening may be defined between a rear edge of the roof 4, a top edge of the rear structure 3, and rear portions of the pair of side panels 6, and a rear window glass may be mounted in the rear opening.

The chassis frame structure 10 may be configured to firmly support the front structure 2, the rear structure 3, the floor 5, and the pair of side panels 6.

Figure 2:
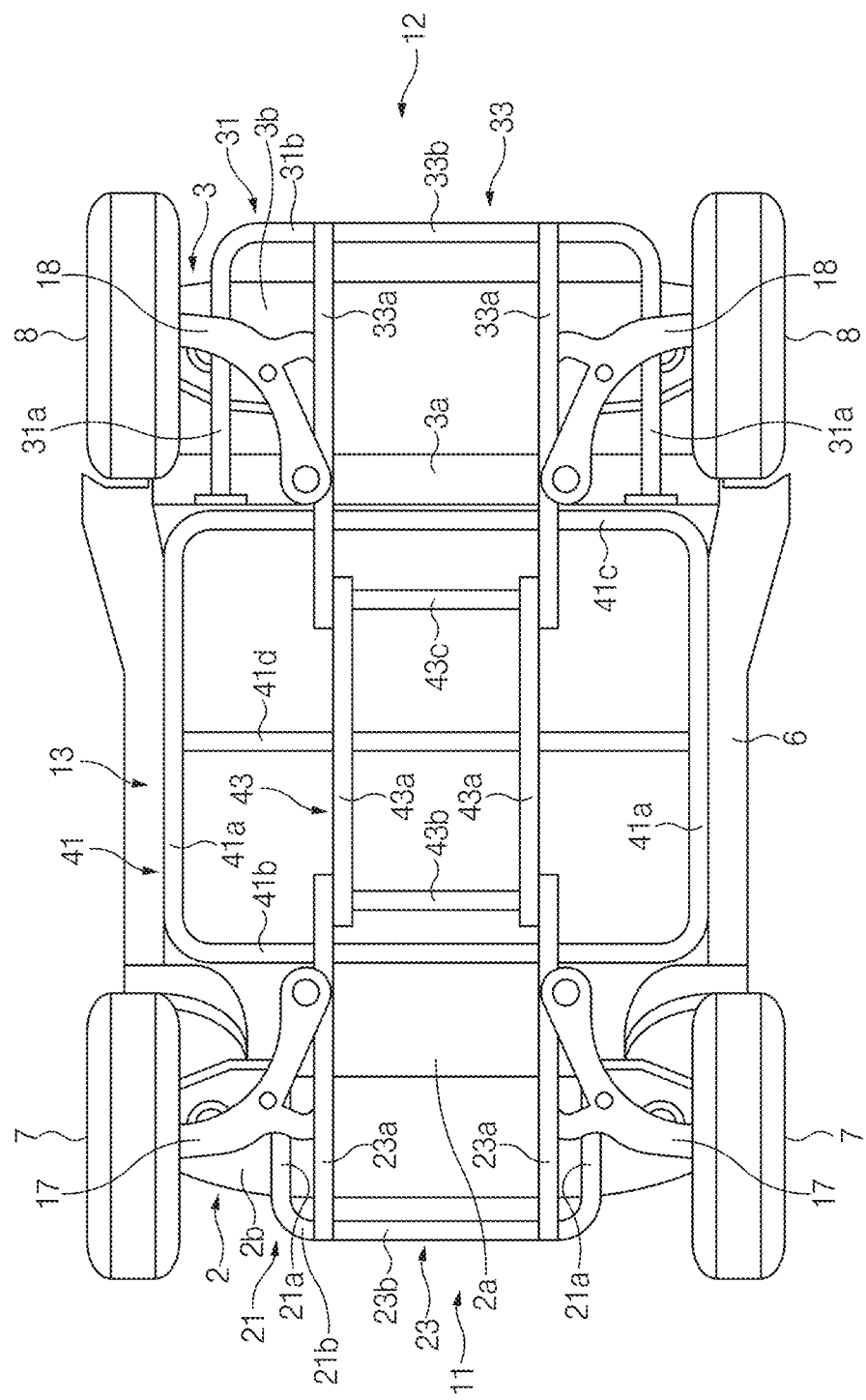
FIG. 2 illustrates a view, which is viewed in a direction indicated by arrow A of FIG. 1.

Referring to FIGS. 2 and 3, the chassis frame structure 10 may include a front support portion 11 supporting the front structure 2. The front support portion 11 may include a front support frame 21 supporting the front structure 2 of the vehicle body 1 in a longitudinal direction of the vehicle body 1 and a pair of upper support members 22 supporting the front structure 2 of the vehicle body 1 in a height direction of the vehicle body 1.

The front support frame 21 may include a pair of front support members 21*a* and a transverse member 21*b* connecting the pair of front support members 21*a* in a width direction of the vehicle body 1.

Each front support member 21*a* may extend in the longitudinal direction of the vehicle body 1, and rear ends of the front support members 21*a* may be fixed to the dash panel 2*a* of the front structure 2 using mounting brackets so that the front support members 21*a* may support the dash panel 2*a* of the front structure 2 in the longitudinal direction of the vehicle body 1.

The transverse member 21*b* may extend in the width direction of the vehicle body 1, and the transverse member 21*b* may connect front ends of the front support members 21*a* in the width direction of the vehicle body 1.

Each upper support member 22 may extend from the corresponding front support member 21*a* in the height direction of the vehicle body 1. For example, the upper support member 22 may extend obliquely from the front support member 21*a*. Top ends of the upper support members 22 may be fixed to the front damper mounting panel 2*b* of the front structure 2 using mounting brackets so that the upper support members 22 may support the front damper mounting panel 2*b* of the front structure 2 in the height direction of the vehicle body 1.

The front support portion 11 may further include a front base frame 23 located below the front support frame 21. The front support frame 21 may be connected to the front base frame 23 through a plurality of connection members 24, and each connection member 24 may extend in the height direction of the vehicle body 1.

The front base frame 23 may include a pair of longitudinal members 23*a* and a transverse member 23*b* connecting the pair of longitudinal members 23*a* in the width direction of the vehicle body 1. Each longitudinal member 23*a* may extend in the longitudinal direction of the vehicle body 1, and the transverse member 23*b* may extend in the width direction of the vehicle body 1. The transverse member 23*b* may connect front ends of the longitudinal members 23*a* in the width direction of the vehicle body 1. Two connection members 24 may connect a front portion of the front base frame 23 and a front portion of the front support frame 21 in the height direction of the vehicle body 1.

Referring to FIGS. 2 and 4, the chassis frame structure 10 may include a rear support portion 12 supporting the rear structure 3. The rear support portion 12 may include a rear support frame 31 supporting the rear structure 3 of the vehicle body 1 in the longitudinal direction of the vehicle body 1 and a pair of upper support members 32 supporting the rear structure 3 of the vehicle body 1 in the height direction of the vehicle body 1.

The rear support frame 31 may include a pair of rear support members 31*a* and a transverse member 31*b* connecting the pair of rear support members 31*a* in the width direction of the vehicle body 1.

Each rear support member 31*a* may extend in the longitudinal direction of the vehicle body 1, and front ends of the rear support members 31*a* may be fixed to the lower cover member 3*a* of the rear structure 3 using mounting brackets so that the rear support members 31*a* may support the lower cover member 3*a* of the rear structure 3 in the longitudinal direction of the vehicle body 1.

The transverse member 31*b* may extend in the width direction of the vehicle body 1, and the transverse member 31*b* may connect rear ends of the rear support members 31*a* in the width direction of the vehicle body 1.

Each upper support member 32 may extend from the corresponding rear support member 31*a* in the height direction of the vehicle body 1. For example, the upper support member 32 may extend obliquely from the rear support member 31*a*. Top ends of the upper support members 32 may be fixed to the rear damper mounting panel 3*b* of the rear structure 3 using mounting brackets so that the upper support members 32 may support the rear damper mounting panel 3*b* of the rear structure 3 in the height direction of the vehicle body 1.

The rear support portion 12 may further include a rear base frame 33 located below the rear support frame 31. The rear support frame 31 may be connected to the rear base frame 33 through a plurality of connection members 34, and each connection member 34 may extend in the height direction of the vehicle body 1.

The rear base frame 33 may include a pair of longitudinal members 33*a* and a transverse member 33*b* connecting the pair of longitudinal members 33*a* in the width direction of the vehicle body 1. Each longitudinal member 33*a* may extend in the longitudinal direction of the vehicle body 1, and the transverse member 33*b* may extend in the width direction of the vehicle body 1. The transverse member 33*b* may connect rear ends of the longitudinal members 33*a* in the width direction of the vehicle body 1. Two connection members 34 may connect a rear portion of the rear base frame 33 and a rear portion of the rear support frame 31 in the height direction of the vehicle body 1.

Referring to FIG. 2, the chassis frame structure 10 may include a center support portion 13 supporting the floor 5 and the side panels 6. The center support portion 13 may include a center support frame 41 and a center base frame 43 connected below the center support frame 41.

The center support frame 41 may include a pair of center support members 41*a* extending in the longitudinal direction of the vehicle, a first transverse member 41*b* connecting front ends of the center support members 41*a* in the width direction of the vehicle body 1, a second transverse member 41*c* connecting rear ends of the center support members 41*a* in the width direction of the vehicle body 1, and a third transverse member 41*d* connecting middle portions of the center support members 41*a* in the width direction of the vehicle body 1. A bottom surface of the floor 5 may be fixed to the center support members 41*a*, the first transverse member 41*b*, the second transverse member 41*c*, and the third transverse member 41*d* of the center support frame 41 through a plurality of fasteners, and accordingly the center support frame 41 may firmly support the floor 5.

A front portion of the center support frame 41 and a rear portion of the front base frame 23 may be joined by welding and/or the like, and a rear portion of the center support frame 41 and a front portion of the rear base frame 33 may be joined by welding and/or the like so that the center support frame 41 may connect the front base frame 23 and the rear base frame 33 in the longitudinal direction of the vehicle body 1. Specifically, a bottom surface of the first transverse member 41*b* of the center support frame 41 may be joined to top surfaces of the longitudinal members 23*a* of the front base frame 23 by welding and/or the like, and a bottom surface of the second transverse member 41*c* of the center support frame 41 may be joined to top surfaces of the longitudinal members 33*a* of the rear base frame 33 by welding and/or the like. A bottom end of each side panel 6 may be fixed to an outboard side surface of the corresponding center support member 41*a* of the center support portion 13 through a plurality of fasteners.

The center base frame 43 may include a pair of longitudinal members 43a extending in the longitudinal direction of the vehicle, a first transverse member 43b connecting front ends of the longitudinal members 43a in the width direction of the vehicle body 1, and a second transverse member 43c connecting rear ends of the longitudinal members 43a in the width direction of the vehicle body 1.

A front portion of the center base frame 43 and the front base frame 23 may be joined by welding and/or the like, and a rear portion of the center base frame 43 and the rear base frame 33 may be joined by welding and/or the like so that the center base frame 43 may connect the front base frame 23 and the rear base frame 33 in the longitudinal direction of the vehicle body 1. Specifically, the front ends of the longitudinal members 43a of the center base frame 43 may be joined to the longitudinal members 23a of the front base frame 23, respectively, and the rear ends of the longitudinal members 43a of the center base frame 43 may be joined to the longitudinal members 33a of the rear base frame 33, respectively.

Figure 5:
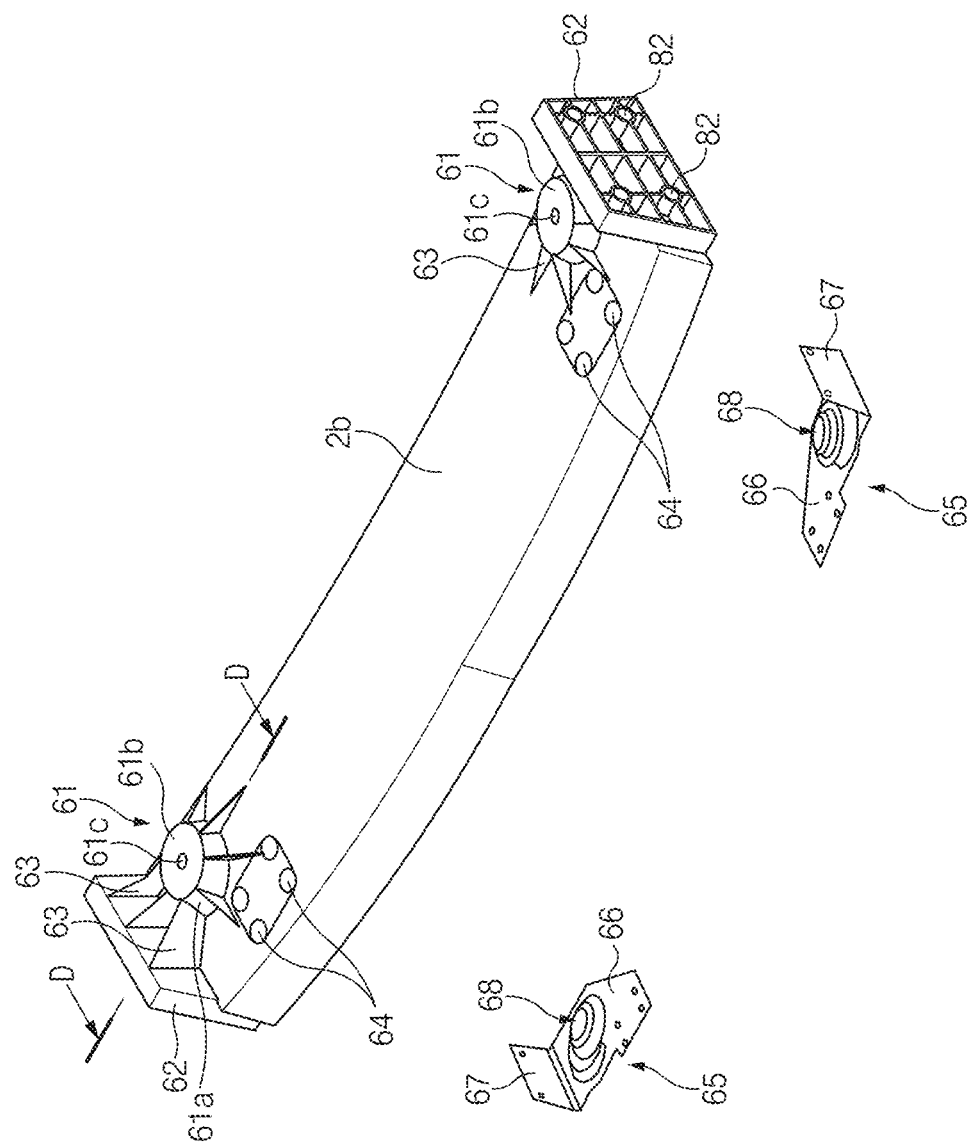
FIG. 5 illustrates a perspective view of a front damper mounting panel of a micro vehicle according to an exemplary embodiment of the present disclosure.

The front damper mounting panel 2b may extend evenly in the width direction of the vehicle body 1, and accordingly the front damper mounting panel 2b may have a flat top surface. Referring to FIGS. 3 and 5, the front damper mounting panel 2b may include a pair of front damper mounting bosses 61 in which the pair of front dampers 15 are mounted, respectively. Each front damper mounting boss 61 may be raised upward from the flat top surface of the front damper mounting panel 2b, and a bottom of the front damper mounting boss 61 may be open. A top end of each front damper 15 may be mounted in the corresponding mounting boss 61.

Each front damper mounting boss 61 may include a sidewall 61a protruding upward from the flat top surface of the front damper mounting panel 2b, a top wall 61b provided on a top edge of the sidewall 61a, and a mounting hole 61c formed in the top wall 61b. The sidewall 61a may be tapered at a predetermined angle, and a fastener may extend through the mounting hole 61c and be connected to the top end of the front damper 15 so that the top end of the front damper 15 may be mounted and supported in the front damper mounting boss 61. A plurality of reinforcing ribs 63 may be connected to the sidewall 61a of the front damper mounting boss 61, and stiffness of the front damper mounting boss 61 may be improved by the plurality of reinforcing ribs 63.

The front damper mounting panel 2b may further include a pair of mounting walls 62 provided on both side edges thereof, respectively. Each mounting wall 62 of the front damper mounting panel 2b may be mounted on the corresponding side panel 6 through a plurality of fasteners.

Figure 6:
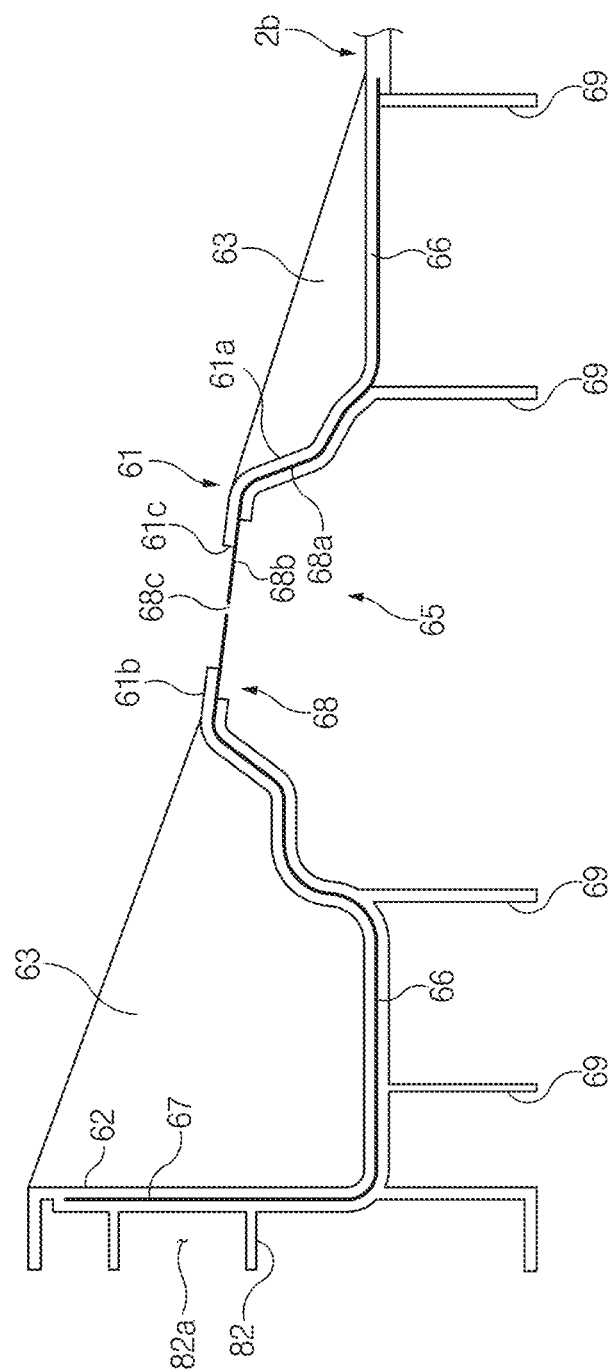
FIG. 6 illustrates a cross-sectional view taken along line D-D of FIG. 5.

Referring to FIGS. 5 and 6, the front damper mounting panel 2b may further include a pair of front reinforcing members 65 embedded in the pair of front damper mounting bosses 61, respectively. Each front reinforcing member 65 may include a first reinforcing portion 66 embedded in a portion of the front damper mounting panel 2b adjacent to the front damper mounting boss 61, a second reinforcing portion 68 embedded in the front damper mounting boss 61, and a third reinforcing portion 67 embedded in the mounting wall 62. The second reinforcing portion 68 may include a sidewall 68a embedded in the sidewall 61a of the front damper mounting boss 61, a top wall 68b embedded in the top wall 61b of the front damper mounting boss 61, and a mounting hole 68c formed in the top wall 68b. The mounting hole 68c of the second reinforcing portion 68 may be aligned with the mounting hole 61c of the front damper mounting boss 61. A fastener may extend through the mounting hole 68c and be connected to the top end of the front damper 15 so that the top end of the front damper 15 may be mounted and supported in the front reinforcing member 65 and the front damper mounting boss 61.

Referring to FIG. 6, the front damper mounting panel 2b may have a plurality of reinforcing ribs 69 provided on a bottom surface thereof, and stiffness of the front damper mounting panel 2b may be improved by the plurality of reinforcing ribs 69.

Figure 9:
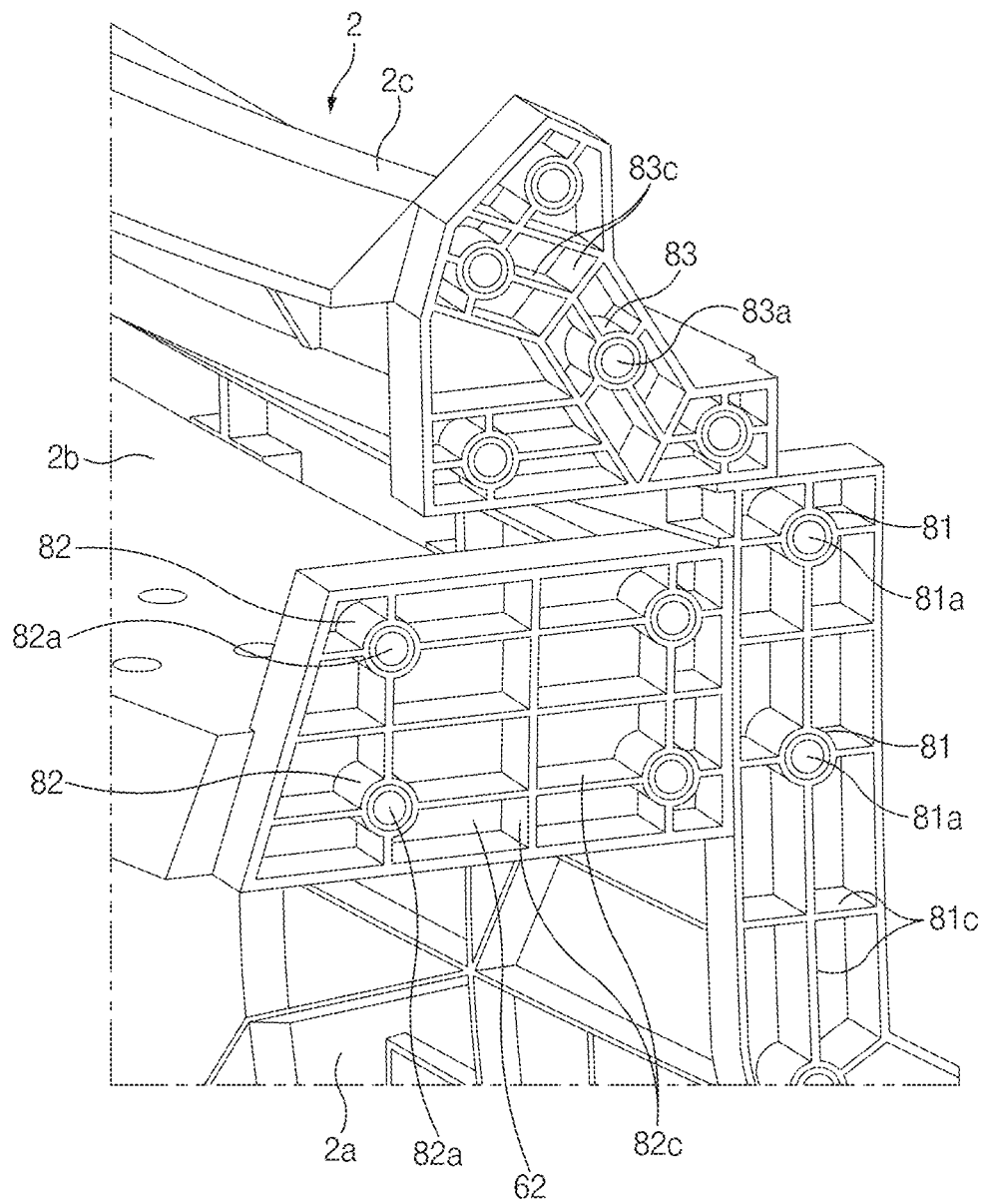
FIG. 9 illustrates a perspective view of one side edge of a front structure of a micro vehicle according to an exemplary embodiment of the present disclosure.

Referring to FIG. 9, the front structure 2 may include a plurality of front mounting bosses 81, 82, and 83 provided on each side edge thereof, and the front portion (front pillar portion) of each side panel 6 may be mounted in the front mounting bosses 81, 82, and 83 of the front structure 2 through a plurality of fasteners. The plurality of front mounting bosses 81, 82, and 83 may include a plurality of first front mounting bosses 81 provided on each side edge of the dash panel 2a, a plurality of second front mounting bosses 82 provided on each side edge of the front damper mounting panel 2b, and a plurality of third front mounting bosses 83 provided on each side edge of the cowl member 2c.

Each first front mounting boss 81 may have a mounting hole 81a defined therein, and a plurality of first reinforcing ribs 81c may be connected to the plurality of first front mounting bosses 81. Accordingly, stiffness of the side edge of the dash panel 2a may be improved by the plurality of first reinforcing ribs 81c.

Referring to FIGS. 5 and 6, the plurality of second front mounting bosses 82 may be formed on each mounting wall 62. Referring to FIG. 9, each second front mounting boss 82 may have a mounting hole 82a defined therein, and a plurality of second reinforcing ribs 82c may be connected to the plurality of second front mounting bosses 82. Accordingly, stiffness of the side edge of the front damper mounting panel 2b may be improved by the plurality of second reinforcing ribs 82c.

Each third front mounting boss 83 may have a mounting hole 83a defined therein, and a plurality of third reinforcing ribs 83c may be connected to the plurality of third front mounting bosses 83. Accordingly, stiffness of the side edge of the cowl member 2c may be improved by the plurality of third reinforcing ribs 83c.

Figure 7:
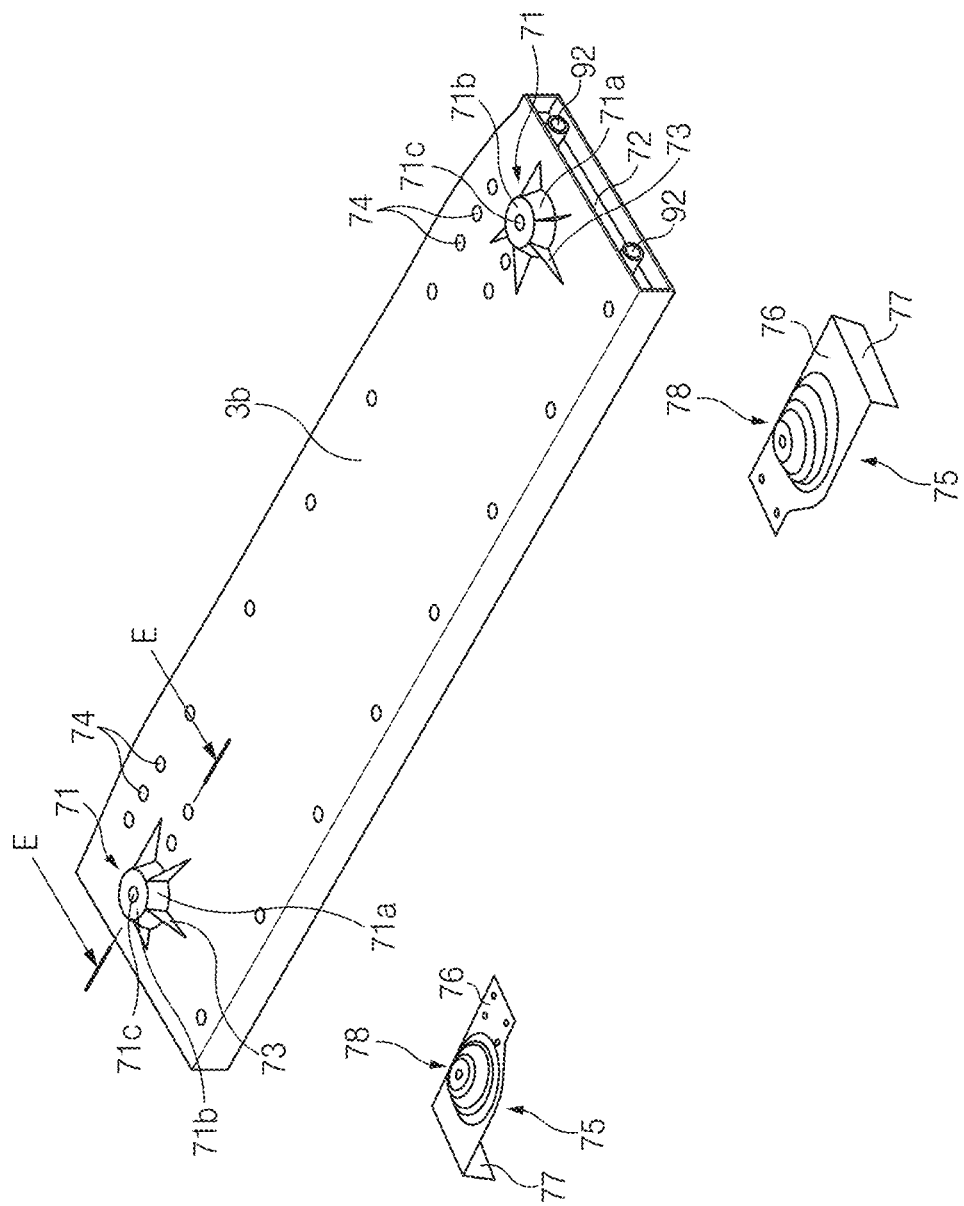
FIG. 7 illustrates a perspective view of a rear damper mounting panel of a micro vehicle according to an exemplary embodiment of the present disclosure.

The rear damper mounting panel 3b may extend evenly in the width direction of the vehicle body 1, and accordingly the rear damper mounting panel 3b may have a flat top surface. Referring to FIGS. 4 and 7, the rear damper mounting panel 3b may include a pair of rear damper mounting bosses 71 in which the pair of rear dampers 16 are mounted, respectively. A top end of each rear damper 16 may be mounted in the corresponding mounting boss 71.

Each rear damper mounting boss 71 may include a sidewall 71a protruding upward from the flat top surface of the rear damper mounting panel 3b, a top wall 71b provided on a top edge of the sidewall 71a, and a mounting hole 71c formed in the top wall 71b. The sidewall 71a may be tapered at a predetermined angle, and a fastener may extend through the mounting hole 71c and be connected to the top end of the rear damper 16 so that the top end of the rear damper 16 may be mounted and supported in the rear damper mounting boss 71. A plurality of reinforcing ribs 73 may be connected to the sidewall 71a of the rear damper mounting boss 71, and stiffness of the rear damper mounting boss 71 may be improved by the plurality of reinforcing ribs 73.

The rear damper mounting panel 3b may further include a pair of mounting walls 72 provided on both side edges thereof, respectively. Each mounting wall 72 of the rear damper mounting panel 3b may be mounted on the corresponding side panel 6 through a plurality of fasteners.

Figure 8:
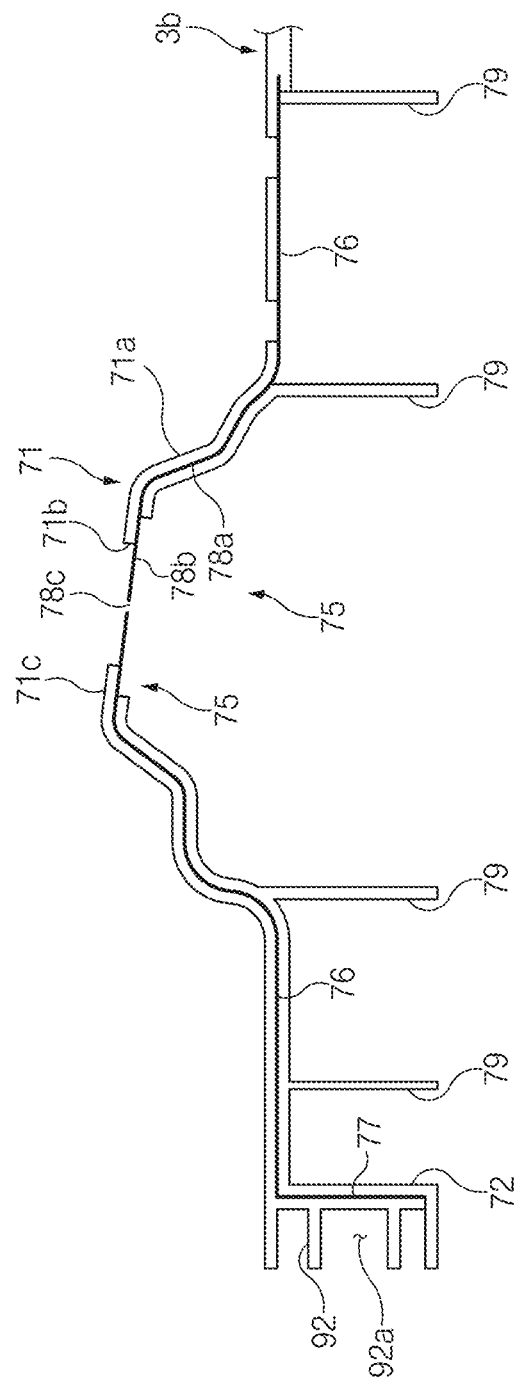
FIG. 8 illustrates a cross-sectional view taken along line E-E of FIG. 7.

Referring to FIGS. 7 and 8, the rear damper mounting panel 3b may further include a pair of rear reinforcing members 75 embedded in the pair of rear damper mounting bosses 71, respectively. Each rear reinforcing member 75 may include a first reinforcing portion 76 embedded in a portion of the rear damper mounting panel 3b adjacent to the rear damper mounting boss 71, a second reinforcing portion 78 embedded in the rear damper mounting boss 71, and a third reinforcing portion 77 embedded in the mounting wall 72. The second reinforcing portion 78 may include a sidewall 78a embedded in the sidewall 71a of the rear damper mounting boss 71, a top wall 78b embedded in the top wall 71b of the rear damper mounting boss 71, and a mounting hole 78c formed in the top wall 78b. The mounting hole 78c of the second reinforcing portion 78 may be aligned with the mounting hole 71c of the rear damper mounting boss 71. A fastener may extend through the mounting hole 78c and be connected to the top end of the rear damper 16 so that the top end of the rear damper 16 may be mounted and supported in the rear reinforcing member 75 and the rear damper mounting boss 71.

Referring to FIG. 8, the rear damper mounting panel 3b may have a plurality of reinforcing ribs 79 provided on a bottom surface thereof, and stiffness of the rear damper mounting panel 3b may be improved by the plurality of reinforcing ribs 79.

Figure 10:
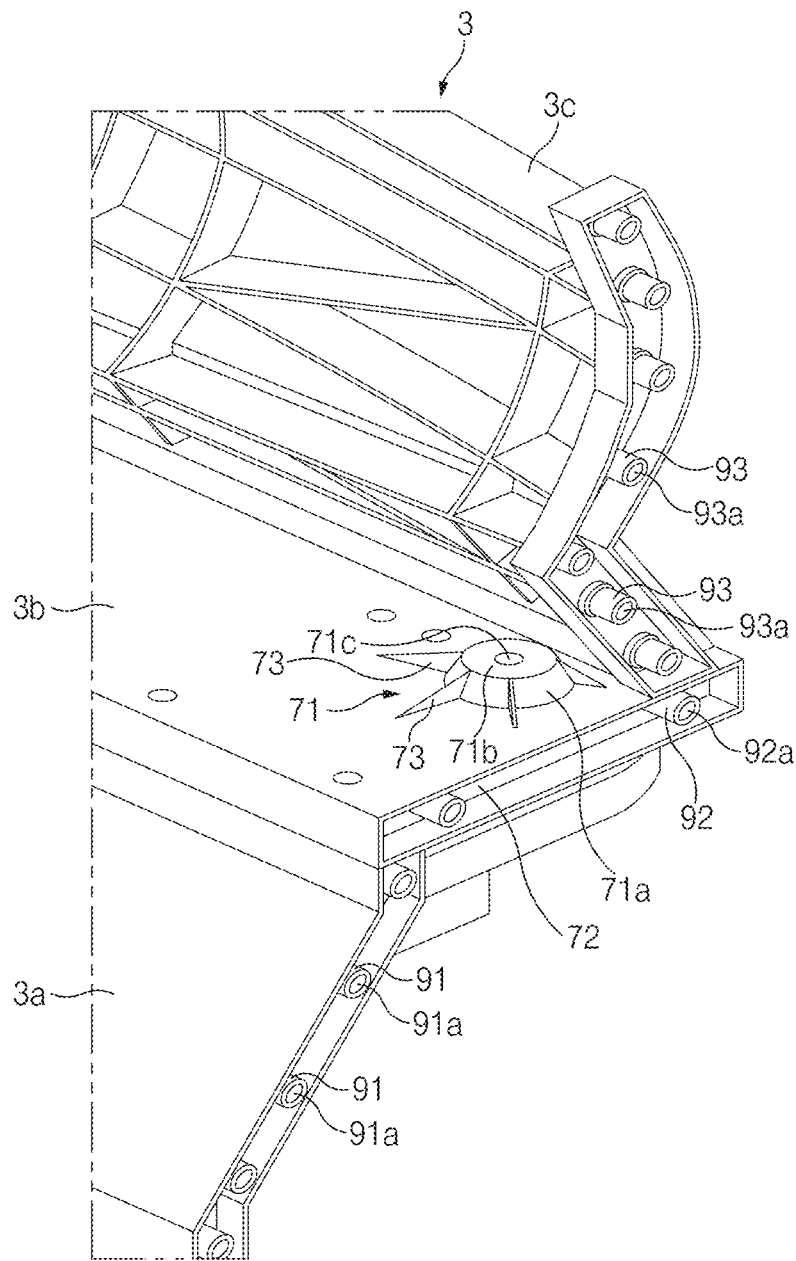
FIG. 10 illustrates a perspective view of one side edge of a rear structure of a micro vehicle according to an exemplary embodiment of the present disclosure.

Referring to FIG. 10, the rear structure 3 may include a plurality of rear mounting bosses 91, 92, and 93 provided on each side edge thereof, and the rear portion (rear pillar portion) of each side panel 6 may be mounted in the rear mounting bosses 91, 92, and 93 of the rear structure 3 through a plurality of fasteners. The plurality of rear mounting bosses 91, 92, and 93 may include a plurality of first rear mounting bosses 91 provided on each side edge of the lower cover member 3a, a plurality of second rear mounting bosses 92 provided on each side edge of the rear damper mounting panel 3b, and a plurality of third rear mounting bosses 93 provided on each side edge of the back panel 3c. Each first rear mounting boss 91 may have a mounting hole 91a defined therein, each second rear mounting boss 92 may have a mounting hole 92a defined therein, and each third rear mounting boss 93 may have a mounting hole 93a defined therein.

According to the above-described exemplary embodiments of the present disclosure, the pair of front dampers 15 may be mounted on the single front damper mounting panel 2b so that the number of components and the weight thereof may be reduced, and connectivity between the pair of front dampers 15 and mounting stiffness of the front dampers 15 may be improved, and thus NVH performance of the vehicle may be improved. Likewise, the pair of rear dampers 16 may be mounted on the single rear damper mounting panel 3b so that the number of components and the weight thereof may be reduced, and connectivity between the pair of rear dampers 16 and mounting stiffness of the rear dampers 16 may be improved, and thus NVH performance of the vehicle may be improved. In addition, as the connectivity between the front damper 15 and the connectivity between the rear damper 16 are increased, static stiffness of the vehicle may be improved.

As set forth above, the micro vehicle according to exemplary embodiments of the present disclosure may be designed to have the pair of front dampers mounted on one front damper mounting panel and the pair of rear dampers mounted on one rear damper mounting panel so that the number of components and the weight thereof may be reduced, and connectivity between the front dampers and connectivity between the rear dampers and mounting stiffness of the front dampers and the rear dampers may be improved, and thus NVH performance of the vehicle may be improved. In addition, as the connectivity between the front damper and the connectivity between the rear damper are increased, static stiffness of the vehicle may be improved.

Hereinabove, although embodiments of the present disclosure have been described with reference to exemplary embodiments and the accompanying drawings, the present disclosure is not limited thereto, but it may be variously modified and altered by those skilled in the art to which the present disclosure pertains without departing from the spirit and scope of the present disclosure claimed in the following claims.

What is claimed is:

1. A micro vehicle comprising:
   a vehicle body comprising:
      a passenger compartment,
      a pair of side panels,
      a front structure comprising a dash panel covering a front portion of the passenger compartment, a front damper mounting panel on an upper portion of the dash panel, and a cowl member on a dash-panel top edge of the dash panel,
         wherein the front damper mounting panel includes a flat top surface, a pair of front damper mounting bosses raised upward from the flat top surface of the front damper mounting panel, and a pair of mounting walls coupled to the pair of side panels, respectively,
         wherein the front damper mounting panel extends in a width direction of the vehicle body, and
      a rear structure comprising a rear damper mounting panel having a pair of rear damper mounting bosses; and
   a chassis frame structure supporting the vehicle body.

2. The micro vehicle according to claim 1, wherein each of the pair of front damper mounting bosses comprises:
   a first sidewall protruding upward from a top surface of the front damper mounting panel;
   a first top wall disposed on a first-sidewall top edge of the first sidewall; and
   a first mounting hole disposed in the first top wall.

3. The micro vehicle according to claim 2, wherein each of the pair of front damper mounting bosses further comprises a plurality of reinforcing ribs connected to the first sidewall.

4. The micro vehicle according to claim 2, wherein the front damper mounting panel comprises a pair of front reinforcing members embedded in the pair of front damper mounting bosses, respectively.

5. The micro vehicle according to claim 4, wherein each of the pair of front reinforcing members comprises:
   a first reinforcing portion embedded in a portion of the front damper mounting panel adjacent to the respective front damper mounting boss; and
   a second reinforcing portion embedded in the respective front damper mounting boss.

6. The micro vehicle according to claim 5, wherein the second reinforcing portion comprises:
   a second sidewall embedded in the first sidewall of the respective front damper mounting boss;
   a second top wall embedded in the first top wall of the respective front damper mounting boss; and
   a second mounting hole disposed in the second top wall.

7. The micro vehicle according to claim 6, wherein the second mounting hole of the second reinforcing portion is aligned with the first mounting hole.

8. The micro vehicle according to claim 1, wherein:
the front structure further comprises a plurality of front mounting bosses disposed on both side edges of the front structure; and
a front portion of each of the pair of side panels is mounted in the plurality of front mounting bosses through a first plurality of fasteners.

9. The micro vehicle according to claim 8, wherein:
the rear structure further comprises a plurality of rear mounting bosses disposed on both side edges of the rear structure; and
a rear portion of each of the pair of side panels is mounted in the plurality of rear mounting bosses through a second plurality of fasteners.

10. The micro vehicle according to claim 1, wherein:
the rear structure further comprises a plurality of rear mounting bosses disposed on both side edges of the rear structure; and
a rear portion of each of the pair of side panels is mounted in the plurality of rear mounting bosses through a plurality of fasteners.

11. A micro vehicle comprising:
a vehicle body comprising:
a passenger compartment,
a pair of side panels,
a front structure comprising a dash panel covering a front portion of the passenger compartment, a front damper mounting panel on an upper portion of the dash panel, and a cowl member on a dash-panel top edge of the dash panel,
wherein the front damper mounting panel includes a flat top surface, a pair of front damper mounting bosses raised upward from the flat top surface of the front damper mounting panel, and a pair of mounting walls coupled to the pair of side panels, respectively,
wherein the front damper mounting panel extends in a width direction of the vehicle body, and
a rear structure comprising a rear damper mounting panel having a pair of rear damper mounting bosses,
wherein each of the pair of rear damper mounting bosses comprises:
a first sidewall protruding upward from a rear-damper-mounting-panel top surface of the rear damper mounting panel,
a first top wall disposed on a first-sidewall top edge of the first sidewall, and
a first mounting hole disposed in the first top wall; and
a chassis frame structure supporting the vehicle body.

12. The micro vehicle according to claim 11, wherein each of the pair of rear damper mounting bosses further comprises a plurality of reinforcing ribs connected to the first sidewall.

13. The micro vehicle according to claim 11, wherein the rear damper mounting panel comprises a pair of rear reinforcing members embedded in the pair of rear damper mounting bosses, respectively.

14. The micro vehicle according to claim 13, wherein each of the pair of rear reinforcing members comprises:
a first reinforcing portion embedded in a portion of the rear damper mounting panel adjacent to the respective rear damper mounting boss; and
a second reinforcing portion embedded in the respective rear damper mounting boss.

15. The micro vehicle according to claim 14, wherein the second reinforcing portion comprises:
a second sidewall embedded in the first sidewall of the respective rear damper mounting boss;
a second top wall embedded in the first top wall of the respective rear damper mounting boss; and
a second mounting hole disposed in the second top wall.

16. The micro vehicle according to claim 15, wherein the second mounting hole of the second reinforcing portion is aligned with the first mounting hole.

17. The micro vehicle according to claim 11, wherein:
the front structure further comprises a plurality of front mounting bosses disposed on both side edges of the front structure; and
a front portion of each of the pair of side panels is mounted in the plurality of front mounting bosses through a first plurality of fasteners.

18. The micro vehicle according to claim 17, wherein:
the rear structure further comprises a plurality of rear mounting bosses disposed on both side edges of the rear structure; and
a rear portion of each of the pair of side panels is mounted in the plurality of rear mounting bosses through a second plurality of fasteners.

19. The micro vehicle according to claim 11, wherein:
the rear structure further comprises a plurality of rear mounting bosses disposed on both side edges of the rear structure; and
a rear portion of each of the pair of side panels is mounted in the plurality of rear mounting bosses through a plurality of fasteners.

20. A micro vehicle comprising:
a chassis frame structure; and
a vehicle body supported by the chassis frame structure, the vehicle body comprising:
a passenger compartment,
a pair of side panels,
a front structure comprising a dash panel covering a front portion of the passenger compartment, a front damper mounting panel on an upper portion of the dash panel, and a cowl member on a top edge of the dash panel,
wherein the front damper mounting panel having includes a flat top surface, a pair of front damper mounting bosses raised upward from the flat top surface of the front damper mounting panel, and a pair of mounting walls coupled to the pair of side panels, respectively,
wherein the front damper mounting panel extends in a width direction of the vehicle body and
wherein each of the pair of front damper mounting bosses comprises:
a first sidewall protruding upward from a front-damper-mounting-panel top surface of the front damper mounting panel,
a first top wall disposed on a first-sidewall top edge of the first sidewall, and
a first mounting hole disposed in the first top wall,
a rear structure comprising a rear damper mounting panel having a pair of rear damper mounting bosses,
wherein each of the pair of rear damper mounting bosses comprises:
a second sidewall protruding upward from a rear-damper-mounting-panel top surface of the rear damper mounting panel, a second top wall disposed on a second-sidewall top edge of the second sidewall, and
a second mounting hole disposed in the second top wall.

* * * * *